Aug. 13, 1929.　　　　　G. H. ISLEY　　　　　1,724,656
OPERATION AND CONSTRUCTION OF REGENERATIVE FURNACES USED IN STEEL MAKING
Filed Jan. 17, 1927　　　2 Sheets-Sheet 1

Patented Aug. 13, 1929.

1,724,656

UNITED STATES PATENT OFFICE.

GEORGE H. ISLEY, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

OPERATION AND CONSTRUCTION OF REGENERATIVE FURNACES USED IN STEEL MAKING.

Application filed January 17, 1927. Serial No. 161,668.

The present invention relates to regenerative furnaces of the open hearth type as used in the manufacture of steel,—the invention residing in a novel method of operation and arrangement of apparatus, whereby outstanding economies in the steel making process are obtained, through the utilization of furnace heat for the pre-conditioning of certain materials used in the steel making process, notably the flux material forming part of the furnace charge.

As is well known, the manufacture of basic open hearth steel requires, for the formation of the necessary slags, the addition to each charge within the furnace of a considerable quantity of flux, which may consist principally either of burnt or calcined lime, or of a somewhat greater quantity of raw limestone, the latter changing in the process to the calcined product, but only at the expense of a somewhat increased duration of the heating period required for the furnace charge. While the cost of burnt or calcined lime is considerably higher than the cost of raw limestone, it is nevertheless a fact that open hearth steel furnaces fluxed with the calcined lime show a slightly lower operating cost per ton of steel produced, because of the material reduction of the heating period for each furnace charge.

It is proposed, by the present invention, to take advantage of the lowered cost of raw limestone as a fluxing material and, at the same time, to secure furnace operation under the reduced periods of heating obtainable with calcined or burnt lime as a flux,—thereby effecting an appreciable saving in the cost per ton of the steel produced by the furnace. The method and means by which such result is obtained will be fully set forth hereinafter, reference being had to the accompanying illustrative drawings, in which—

Like reference characters refer to like parts in the different figures.

Figure 1:
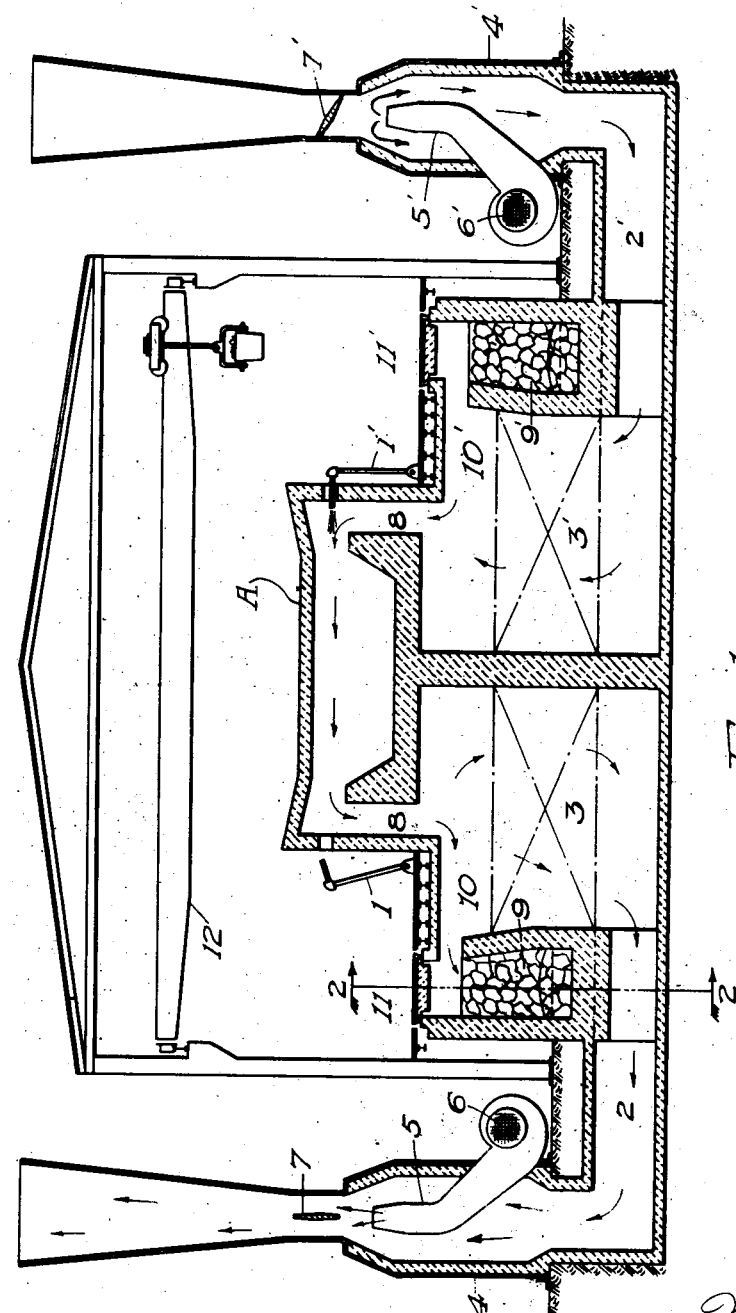
Fig. 1 is a sectional developed view of an open hearth regenerative furnace, in connection with the apparatus appurtenant thereto for the carrying out of my improved method.

The invention is applicable, in general, to any type of regenerative furnace, irrespective of the fuel used therein. The furnace A shown in Fig. 1, for example, is adapted for the use of oil, coke oven gas, tar, powdered coal, and the like, as fuel,—involving the employment of suitable burners 1, 1' at each end of the furnace chamber. Under these conditions, the invention is applicable to the regenerative heating of the air used to support combustion of the fuel, said air being admitted to the furnace, alternately, from opposite ends, by way of passages 2 and 2'; providing the usual checkerwork chambers 3 and 3'. The air regenerator passages 2 and 2' are connected, respectively, to upwardly opening ducts 4 and 4', each preferably in the form, substantially, of a Venturi tube. Within the ducts 4 and 4', in proper relation to the Venturi throats thereof, are the upwardly directed nozzles 5 and 5', respectively, these nozzles being supplied with air by their respective exteriorly located blowing devices 6 and 6', each driven by any suitable means, such as an electric motor, not shown.

Within the throat portion of each Venturi tube is disposed a valve or damper, one being numbered 7 and the other 7'. Each valve or damper has its spindle extended through the wall of the tube to carry an operating arm, not shown, the latter being movable to dispose the associated valve or damper in its closed or in its open position, either by hand or automatically, as fully described in my copending application Serial No. 149,436, filed November 19, 1926, depending upon the direction desired for the flow of air and gases through the associated duct 4 or 4'.

In connection with the passage of gases through the furnace from right to left as shown in Fig. 1, the left hand burner 1 is held in an inoperative position, and the right hand burner 1' is made to furnish the fuel to the furnace. The air for supporting combustion is drawn from the atmosphere into the blower 6', which is operated, at this time, at a relatively low speed, and said air is directed downwardly through the duct 4' by the closed valve 7' into the passage 2'. Thence it flows, partly by way of heated checkerwork chamber 3' and partly by another heated channel, hereinafter to be described, to the furnace port 8', adjacent the burner 1'. Here the hot air mixes with fuel from burner 1' and the resulting combustible mixture is burned in the furnace. It is obvious that by controlling the amount of fuel passing through burner 1 and the amount of air drawn in by blower 6', (by adjustment of its motor's speed) the proper combustion may be maintained in the furnace.

The products of combustion leave the furnace by way of port 8, being drawn by way of checkerwork 3 and an adjacent channel, hereinafter to be described, into the passage 2 and upwardly through the duct 4, for discharge from the top of said duct, by the entraining action of the air discharged from nozzle 5 at relatively high pressure due to the operation of blower 6 at high speed,— which air has free exit through the duct 4, due to the fact that the valve 7 in said duct, under this condition of furnace operation, stands in a full open position. As described in my aforesaid copending application, the reversal of the furnace is effected by causing the burner 1 to become operative and the burner 1' inoperative, by closing the valve 7 and opening the valve 7', and by reducing the speed of blower 6 and increasing the speed of blower 6'; in this way, at predetermined intervals, the direction of gaseous flow through the furnace and its associated passages may be reversed, so that the ingoing air for supporting combustion may always be brought to the desired high temperature by passage through that checkerwork chamber (3 or 3', as the case may be) and that adjacent channel or chamber which have been highly heated by the outgoing waste products.

As shown in the drawings, the regenerator construction involves a radical departure from existing practice, in that it includes, adjacent the checkerwork, a preferably integral chamber (9 or 9') in the form substantially of a kiln, open at the top to the passage (10 or 10') which connects the checkerwork with the furnace port, and open at the bottom (Fig. 2) to the passage 2 or 2', as the case may be.

Figure 2:
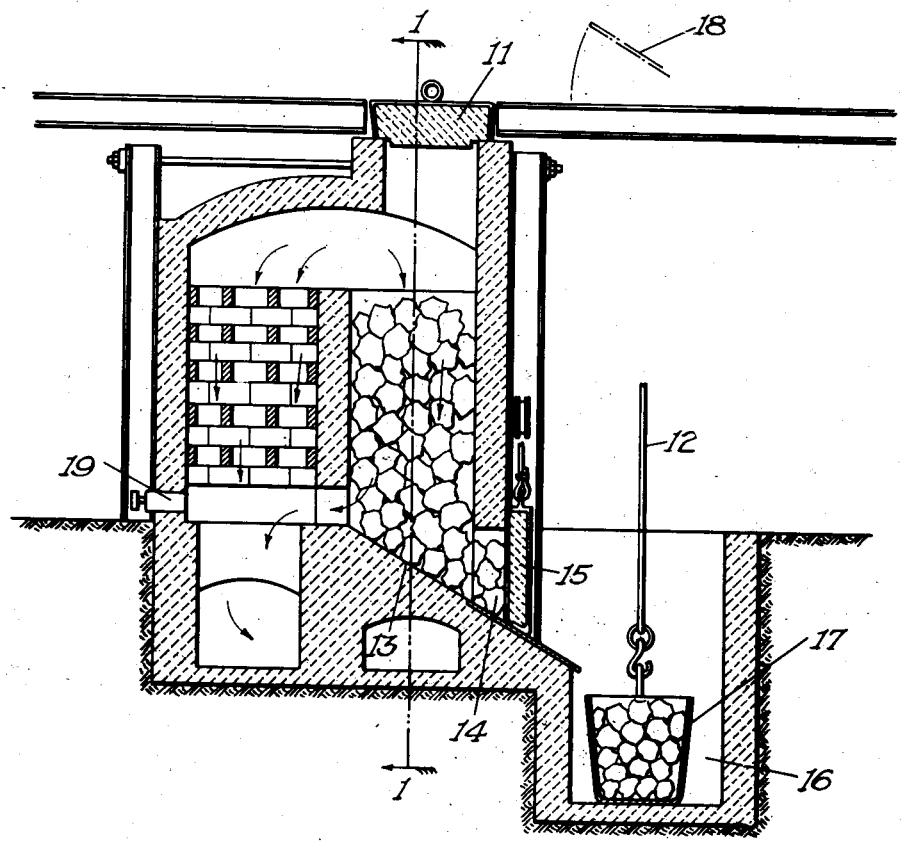
Fig. 2 is an enlarged sectional view on the line 2—2 of Fig. 1.

Each of these kilns is adapted to be charged in any suitable way with raw limestone, or any other material required to be reduced by burning,—as for instance, through a top opening having a removable cover 11, substantially at the floor level of the furnace. This permits mechanical charging of each kiln from the usual overhead travelling crane 12 that is customarily provided for charging the open hearth furnace A. As shown in Fig. 2, each kiln 9 preferably has its bottom sloped toward the side, as indicated at 13, so as to promote the gravity discharge therefrom through a side opening 14, normally closed by a gate 15. Upon opening said gate 15, the material from the kiln is free to discharge by gravity into a pit 16, within which may conveniently be received a bucket or other receptacle 17, preferably suspended from the same crane 12 that serves for the charging of the kiln; at the furnace floor level, a trap door 18 may be provided, through which the product of the kiln can be elevated to the charging floor, for subsequent handling by the furnace operators.

In the operation of the furnace, which is periodically reversed in the manner above described, it is to be noted that a portion of the extremely hot waste gases from the furnace pass as usual through the checkerwork chamber 3 or 3', as the case may be, while the remainder pass through the adjacent kiln 9, serving thereby to burn the charge of said kiln and to convert it, in the case of raw limestone, ultimately into calcined lime. When the conversion is complete, the product of the kiln may be discharged in the manner above described, and means are preferably provided in the form of a removable plug 19, Fig. 2, in the regenerator wall for inserting a bar to agitate the kiln charge, should its discharge be obstructed in any way. The calcined product of the kiln or kilns, resulting from successive discharges of the same during a run of heat of the furnace, can be suitably stored, in readiness for utilization as the flux forming part of subsequent furnace charges, as will be well understood.

The above described system of mechanical draft for the furnace A lends itself very readily to the novel process or mode of operation under which the heat of the outgoing gases from the furnace, which would otherwise be largely wasted, is utilized, most economically, and without sacrifice of the regenerative heating of the air to support combustion, for the calcining of the limestone in the kiln or kilns 9, since the blowers 6 and 6' are capable of wide variations in speed, to create, when needed, sufficient draft for the diversion of a portion of the hot waste gases through the kiln, without in any way affecting the efficiency of the heating process in the furnace proper, or of the transfer of heat to the air in the regenerator passages. It is to be understood, however, that my invention in its broader aspects is not limited to a mechanically drafted furnace, nor necessarily to the production of the particular fluxing material, calcined lime, in the regenerator kiln or kilns, but that what I claim as new and desire to secure by Letters Patent is:—

I claim,

1. The within described improvement in the operation of a regenerative open hearth furnace which consists in utilizing a portion of the heat of the outgoing gases of said furnace for conditioning material subsequently to be used as part of the furnace charge, and utilizing the heat of said material, on reversal of the furnace, to raise the temperature of the air employed to support combustion in the furnace.

2. The within described improvement in the operation of a regenerative open hearth furnace which consists in utilizing a portion of the outgoing hot gases delivered during one heat of the furnace for burning material which is to form a part of the furnace charge on a subsequent heat of said furnace, and during said first mentioned heat of the furnace procuring the passage of air used to support combustion when the furnace is reversed, through said heated charge-forming material.

3. The combination with an open hearth regenerative furnace, of means associated with one of the regenerators thereof for exposing slag-forming flux material for a subsequent furnace charge to the action of the hot outgoing furnace gases passing through said regenerator said means, on the reversal of the furnace, adapted to supply heat for the air used for the support of combustion within the furnace.

4. The combination with an open hearth regenerative furnace, of a kiln in one of the regenerators of said furnace, the contents of said kiln being subjected to the heat of the outgoing furnace gases in said regenerator, and, on reversal of the furnace, giving up heat to the air used to support combustion in the furnace.

5. The combination with an open hearth regenerative furnace, of a kiln in one of the regenerators of said furnace, drafting means operable on the hot gases exhausted from said furnace to draw them through said regenerator and kiln, and other drafting mean operable, on the reversal of the furnace, to force air into said furnace through said regenerator and kiln, thereby alternately to effect the burning of the contents of said kiln and to supply heat to the air used for the support of combustion within the furnace.

Dated this twelfth day of January, 1927.

GEORGE H. ISLEY.